United States Patent
Carr

(10) Patent No.: US 9,512,687 B2
(45) Date of Patent: *Dec. 6, 2016

(54) SHAKER AND DEGASSER COMBINATION

(71) Applicant: M-I L.L.C., Houston, TX (US)

(72) Inventor: Brian S. Carr, Burlington, KY (US)

(73) Assignee: M-I L.L.C., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/138,048

(22) Filed: Dec. 21, 2013

(65) Prior Publication Data

US 2015/0176351 A1 Jun. 25, 2015
US 2015/0337609 A9 Nov. 26, 2015

Related U.S. Application Data

(63) Continuation of application No. 11/862,955, filed on Sep. 27, 2007, now Pat. No. 8,613,360.

(Continued)

(51) Int. Cl.
  *B07C 5/00* (2006.01)
  *E21B 21/06* (2006.01)
  (Continued)

(52) U.S. Cl.
  CPC ......... *E21B 21/065* (2013.01); *B01D 19/0036* (2013.01); *B01D 33/009* (2013.01);
  (Continued)

(58) Field of Classification Search
  CPC .... B07B 1/46; B07B 2201/04; B07B 2230/01; E21B 21/065; B01D 33/72; B01D 33/0376; B04C 5/14
  (Continued)

(56) References Cited

U.S. PATENT DOCUMENTS 2,161,500 A   5/1939   Bird et al.
2,462,878 A   3/1949   Logue
(Continued)

FOREIGN PATENT DOCUMENTS

CA   970724   7/1975
CA   2557934 A1   11/2005
(Continued)

OTHER PUBLICATIONS

Notice of Allowance issued in related U.S. Appl. No. 13/845,704; Dated Mar. 5, 2015 (13 pages).

(Continued)

*Primary Examiner* — Joseph C Rodriguez
*Assistant Examiner* — Kalyanavenkateshware Kumar
(74) *Attorney, Agent, or Firm* — Osha Liang LLP

(57) ABSTRACT

A system for separating components of a slurry is disclosed, the system including a housing; a basket for holding at least one shaker screen, the basket movably mounted in the housing; at least one vibrator coupled to the basket; a sump disposed below the basket to collect at least a portion of the slurry passing through the at least one shaker screen; a pressure differential device fluidly connected to the sump for developing a pressure differential across the at least one shaker screen; and a toggling device for toggling the pressure differential across the screen. A system including a degassing chamber fluidly connected to a sump and a pressure differential device, wherein the degassing chamber is disposed between the sump and the pressure differential device, and a fluid conduit fluidly connected to the degassing chamber for recovering a degassed fluid is also disclosed.

20 Claims, 6 Drawing Sheets

Related U.S. Application Data

(60) Provisional application No. 60/827,567, filed on Sep. 29, 2006, provisional application No. 60/827,542, filed on Sep. 29, 2006.

(51) Int. Cl.

| | |
|---|---|
| *B07B 1/46* | (2006.01) |
| *B01D 33/03* | (2006.01) |
| *B01D 33/72* | (2006.01) |
| *B01D 19/00* | (2006.01) |
| *B01D 35/20* | (2006.01) |
| *B01D 33/00* | (2006.01) |
| *B04C 5/14* | (2006.01) |

(52) U.S. Cl.
CPC ......... *B01D 33/0376* (2013.01); *B01D 33/72* (2013.01); *B01D 35/20* (2013.01); *B07B 1/46* (2013.01); *E21B 21/067* (2013.01); *B04C 5/14* (2013.01); *B07B 2201/04* (2013.01); *B07B 2230/01* (2013.01)

(58) Field of Classification Search
USPC .... 209/363, 364, 365.1, 552, 591, 643, 731; 210/384, 416.1, 785
See application file for complete search history.

(56) References Cited

U.S. PATENT DOCUMENTS

| | | |
|---|---|---|
| 2,663,427 A | 12/1953 | Ennis et al. |
| 2,748,884 A | 6/1956 | Erwin |
| 3,815,473 A | 6/1974 | Jones, Jr. |
| 3,888,352 A | 6/1975 | Kulseth |
| 3,929,642 A | 12/1975 | Ennis et al. |
| 3,970,552 A | 7/1976 | Bongert |
| 4,298,572 A | 11/1981 | Moffet et al. |
| 4,350,591 A | 9/1982 | Lee |
| 4,397,659 A | 8/1983 | Gowan et al. |
| 4,492,862 A | 1/1985 | Grynberg et al. |
| 4,546,783 A | 10/1985 | Lott |
| 4,635,735 A | 1/1987 | Crownover |
| 4,639,258 A | 1/1987 | Schellstede et al. |
| 4,725,352 A | 2/1988 | Haliotis |
| 4,750,920 A | 6/1988 | Manuel et al. |
| 4,886,608 A | 12/1989 | Cook |
| 5,098,586 A | 3/1992 | Rudolph |
| 5,259,952 A | 11/1993 | Lee |
| 5,341,882 A | 8/1994 | Hale |
| 5,431,882 A | 7/1995 | Nokihara et al. |
| 5,462,673 A | 10/1995 | Piers |
| 5,996,484 A | 12/1999 | Reddoch |
| 6,092,390 A | 7/2000 | Griffith |
| 6,164,380 A | 12/2000 | Davis |
| 6,170,580 B1 | 1/2001 | Reddoch |
| 6,389,818 B2 | 5/2002 | Cho et al. |
| 6,389,878 B1 | 5/2002 | Zamfes |
| 6,443,001 B1 | 9/2002 | Duriez et al. |
| 6,474,289 B1 | 11/2002 | Lilly et al. |
| 6,607,659 B2 | 8/2003 | Hensley et al. |
| 6,681,874 B2 | 1/2004 | Risher et al. |
| 7,096,942 B1 | 8/2006 | de Rouffignac et al. |
| 7,392,138 B2 | 6/2008 | Frechin et al. |
| 7,704,299 B2 | 4/2010 | Mueller et al. |
| 7,727,316 B2 | 6/2010 | Mueller et al. |
| 7,740,761 B2 | 6/2010 | Bailey |
| 7,767,628 B2 | 8/2010 | Kippie et al. |
| 8,394,270 B2 | 3/2013 | Vasshus et al. |
| 8,746,460 B2 | 6/2014 | Vasshus et al. |
| 2002/0056667 A1 | 5/2002 | Baltzer et al. |
| 2003/0131700 A1 | 7/2003 | Balz et al. |
| 2004/0154963 A1 | 8/2004 | Rayborn |
| 2005/0054623 A1 | 3/2005 | Dudley |
| 2005/0082236 A1 | 4/2005 | Derrick et al. |
| 2005/0183994 A1 | 8/2005 | Hensley et al. |
| 2006/0016768 A1 | 1/2006 | Grichar et al. |
| 2006/0113220 A1 | 6/2006 | Scott et al. |
| 2006/0254421 A1 | 11/2006 | Boone |
| 2007/0199703 A1 | 8/2007 | Freeman et al. |
| 2007/0245839 A1 | 10/2007 | Rieberer |
| 2008/0078699 A1 | 4/2008 | Carr |
| 2008/0078700 A1 | 4/2008 | Jones et al. |
| 2010/0012556 A1 | 1/2010 | Phole |
| 2011/0284481 A1 | 11/2011 | Pomerleau |
| 2012/0279932 A1 | 11/2012 | Pomerleau |
| 2013/0074360 A1 | 3/2013 | Pomerleau |
| 2013/0092637 A1 | 4/2013 | Pomerleau |

FOREIGN PATENT DOCUMENTS

| | | |
|---|---|---|
| CA | 2664173 | 4/2008 |
| CA | 2712774 | 11/2010 |
| GB | 2089403 | 5/1982 |
| SU | 99315 A1 | 11/1953 |
| SU | 297691 A1 | 3/1971 |
| SU | 391868 A1 | 7/1973 |
| WO | 92/19354 A1 | 11/1992 |
| WO | WO2005/054623 | 6/2005 |
| WO | WO2010/048718 | 5/2010 |
| WO | WO2011/113132 | 9/2011 |
| WO | WO2011/140635 | 11/2011 |

OTHER PUBLICATIONS

Office Action issued in U.S. Appl. No. 14/448,036; Dated Oct. 31, 2014 (9 pages).
Pomerleau, PCT/CA2011/000542, International Written Opinion, Oct. 25, 2011.
Pomerleau, PCT/CA2010/000501, International Written Opinion, Jul. 10, 2010.
Pomerleau, PCT/CA2011/000542, International Search Report, Oct. 25, 2011.
Pomerleau, PCT/CA2010/000501, International Search Report, Jul. 10, 2010.
Document from Impeachment Proceedings Related to Canadian Patent No. 2,712,774; Reply to Defence and Counterclaim; Feb. 21, 2013; 7 pages.
Document from Impeachment Proceedings Related to Canadian Patent No. 2,712,774; Statement of Claim; Oct. 26, 2012; 82 pages.
Document from Impeachment Proceedings Related to Canadian Patent No. 2,712,774; Statement of Defence and Counterclaim; Dec. 21, 2012; 13 pages.
Office Action & English Translation; Russian Patent Application No. 2011120971; May 8, 2013.
Notice of Allowance issued in related U.S. Appl. No. 14/448,036; Dated May 29, 2015 (12 pages).
Office Action in related U.S. Appl. No. 13/845,704, mailed Oct. 15, 2014 (14 pages).
Examination Report issued in Canadian Application No. 2,841,278; Dated Oct. 8, 2014 (3 pages).
Notice of Entry of Judgment Accompanied by Opinion; *M-I LLC* vs. *FPUSA, LLC*; 2015-1870 (Fed. Cir.); Appeal from the United States District Court for the Western District of Texas in Civil Action No. 5:15-CV-406; Sep. 24, 2015 (10 pages).
Office Action issued in Canadian Application No. 2,887,756; Dated Aug. 7, 2015 (3 pages).
Official Action issued in Norwegian Application No. 20150464; Dated Jul. 29, 2015 (4 pages).
FPUSA's Opposition to M-I's Motion for Preliminary Injunction; *M-I LLC* vs. *FPUSA, LLC*; Civil Action No. 5:15-cv-00406-DAE; Dated Jun. 5, 2015 (29 pages).
Exhibit 1 to FPUSA's Opposition to M-I's Motion for Preliminary Injunction; Declaration of Peter Matthews; *M-I LLC* vs. *FPUSA, LLC*; Civil Action No. 5:15-cv-00406; Dated Jun. 5, 2015 (24 pages).
Exhibit 2 to FPUSA's Opposition to M-I's Motion for Preliminary Injunction; Declaration of Doug Bruce; *M-I LLC* vs. *FPUSA, LLC*; Civil Action No. 5:15-cv-00406; Dated Jun. 5, 2015 (5 pages).

(56) References Cited

OTHER PUBLICATIONS

Exhibit 3 to FPUSA's Opposition to M-I's Motion for Preliminary Injunction; Declaration of Dennis Jackson; *M-I LLC* vs. *FPUSA, LLC;* Civil Action No. 5:15-cv-00406; Dated Jun. 3, 2015 (5 pages).
Exhibit 4 to FPUSA's Opposition to M-I's Motion for Preliminary Injunction; Declaration of Robert Russell; *M-I LLC* vs. *FPUSA, LLC;* Civil Action No. 5:15-cv-00406; Dated Jun. 5, 2015 (4 pages).
Exhibit 11 to FPUSA's Opposition to M-I's Motion for Preliminary Injunction; Amendment to Office Action issued Mar. 28, 2014, in U.S. Appl. No. 13/845,704; Electronically Submitted Jun. 24, 2014 (17 pages).
Exhibit 15 to FPUSA's Opposition to M-I's Motion for Preliminary Injunction; Amendment to Office Action issued Oct. 15, 2014, in U.S. Appl. No. 13/845,704; Electronically Submitted Nov. 12, 2014 (15 pages).
M-I LLC's Reply Brief in Support of its Motion for Preliminary Injunction; *M-I LLC* vs. *FPUSA, LLC;* Civil Action No. 5:15-cv-00406-DAE; Dated Jun. 10, 2015 (25 pages).
Exhibit R to Plaintiff M-I LLC's Reply Brief in Support of M-I LLC's Motion for Preliminary Injunction; *M-I LLC* vs. *FPUSA, LLC;* Civil Action No. 5:15-cv-00406-DAE; "New technology to recover oil-based mud overcomes ultrafines challenge"; Drilling Contractor; Jul. 6, 2011 (4 pages).
Exhibit S to Plaintiff M-I LLC's Reply Brief in Support of M-I LLC's Motion for Preliminary Injunction; *M-I LLC* vs. *FPUSA, LLC;* Civil Action No. 5:15-cv-00406-DAE; Technology Evaluation Report, F.P. Marangoni Vac-Screen Mud Recovery System, for Cenovus Energy; Prepared by Matthews, P., Performance Fluid Management Inc.; Apr. 2013 (15 pages).
Exhibit U to Plaintiff M-I LLC's Reply Brief in Support of M-I LLC's Motion for Preliminary Injunction; *M-I LLC* vs. *FPUSA, LLC;* Civil Action No. 5:15-cv-00406-DAE; Office Action issued in U.S. Appl. No. 13/622,216 which is assigned to FP Marangoni; Dated Jan. 7, 2014 (21 pages).
Exhibit V to Plaintiff M-I LLC's Reply Brief in Support of M-I LLC's Motion for Preliminary Injunction; *M-I LLC* vs. *FPUSA, LLC;* Civil Action No. 5:15-cv-00406-DAE; Response to Office Action issued Jan. 7, 2014, in U.S. Appl. No. 13/622,216 which is assigned to FP Marangoni; Electronically Submitted Jul. 7, 2014 (40 pages).
Exhibit Y to Plaintiff M-I LLC's Reply Brief in Support of M-I LLC's Motion for Preliminary Injunction; *M-I LLC* vs. *FPUSA, LLC;* Civil Action No. 5:15-cv-00406-DAE; Closed Loop Packages; Implement Vac-Screen System (VSS) technology into multiple shaker screen panels to further reduce OOC and minimize waste stream; http://fpusaoilfield.com/closed-loop-systems/; Jun. 10, 2015 (3 pages).
Order Granting Plaintiff's Motion for Preliminary Injunction; *M-I LLC* vs. *FPUSA, LLC;* Civil Action No. SA:15-CV-00406-DAE; Dated Jun. 24, 2015 (31 pages).
Emergency Motion for Reconsideration of Order Granting Preliminary Injunction; *M-I LLC* vs. *FPUSA, LLC;* Civil Action No. 5:15-cv-00406-DAE; Dated Jun. 25, 2015 (11 pages).
Emergency Motion for Stay of Order Granting Preliminary Injunction Pending Emergency Motion for Reconsideration and, if Necessary, Pending Appeal; *M-I LLC* vs. *FPUSA, LLC;* Civil Action No. 5:15-cv-00406-DAE; Dated Jun. 25, 2015 (23 pages).
Transcript of Motion for Preliminary Injunction Hearing Proceedings Before the Honorable David A. Ezra Senior United States District Judge; *M-I LLC* vs. *FPUSA, LLC;* Civil Action No. SA:15-CV-00406-DAE; Dated Jun. 30, 2015 (56 pages).
Reply in Support of Emergency Motion for Reconsideration of Order Granting Preliminary Injunction; *M-I LLC* vs. *FPUSA, LLC;* Civil Action No. 5:15-cv-00406-DAE; Dated Jul. 8, 2015 (17 pages).
Exhibit 2; Response to final Office Action issued Oct. 15, 2014, in U.S. Appl. No. 13/845,704; Electronically Submitted Nov. 12, 2014 (12 pages).
Exhibit 3; Continuation U.S. Appl. No. 13/845,704; Submitted Mar. 18, 2013 (40 pages).
Order Denying Defendant's Motion for Reconsideration; *M-I LLC* vs. *FPUSA, LLC;* Civil Action No. SA:15-CV-00406-DAE; Dated Jul. 21, 2015 (21 pages).
Opening Brief of Appellant; Case No. 15-1870 in the United States Court of Appeals for the Federal Circuit; *M-I LLC* vs. *FPUSA, LLC;* Dated Aug. 10, 2015 (151 pages).
Complaint for Patent Infringement of U.S. Pat No. 9,004,288; *M-I LLC* vs. *FPUSA, LLC;* Civil Action No. 5:15-CV-406; Dated May 15, 2015 (5 pages).
Plaintiff M-I LLC's Motion for Preliminary Injunction; *M-I LLC* vs. *FPUSA, LLC;* Civil Action No. 5-15-CV-00406 (DAE); Dated May 21, 2015 (19 pages).
Exhibit C to Plaintiff M-I LLC's Motion for Preliminary Injunction; *M-I LLC* vs. *FPUSA, LLC;* Case No. 5:15-CV-00406 (DAE); "Screen Pulse Fluid and Cuttings Separator"; M-I LLC; 2014 (9 pages).
Exhibit D to Plaintiff M-I LLC's Motion for Preliminary Injunction; *M-I LLC* vs. *FPUSA, LLC;* Case No. 5:15-CV-00406 (DAE); FPUSA, LLC: Overview LinkedIn; https://www.linkedin.com/company/fpusa-llc; May 15, 2015 (3 pages).
Exhibit E to Plaintiff M-I LLC's Motion for Preliminary Injunction; *M-I LLC* vs. *FPUSA, LLC;* Case No. 5:15-CV-00406 (DAE); "About VSS"; http://fpusaoilfield.com/about-vss/; Apr. 30, 2015 (3 pages).
Exhibit F to Plaintiff M-I LLC's Motion for Preliminary Injunction; *M-I LLC* vs. *FPUSA, LLC;* Case No. 5:15-CV-00406 (DAE); "Operations"; http://fpusaoilfield.com/operations/; May 8, 2015 (2 pages).
Exhibit G to Plaintiff M-I LLC's Motion for Preliminary Injunction; *M-I LLC* vs. *FPUSA, LLC;* Case No. 5:15-CV-00406 (DAE); Running Cuttings Dryer?; http://fpusaoilfield.com/cuttings-dryer/; May 8, 2015 (3 pages).
Exhibit H to Plaintiff M-I LLC's Motion for Preliminary Injunction; *M-I LLC* vs. *FPUSA, LLC;* Case No. 5:15-CV-00406 (DAE); "Traditional VSS"; http://fpusaoilfield.com/traditional-vss/; May 8, 2015 (3 pages).
Exhibit I to Plaintiff M-I LLC's Motion for Preliminary Injunction; *M-I LLC* vs. *FPUSA, LLC;* Case No. 5:15-CV-00406 (DAE); "VSS Vs. Drying Shakers" (flow line or drying); http://fpusaoilfield.com/vss-vs-drying-shakers/; May 8, 2015 (3 pages).
Exhibit J to Plaintiff M-I LLC's Motion for Preliminary Injunction; *M-I LLC* vs. *FPUSA, LLC;* Case No. 5:15-CV-00406 (DAE); http://fpusaoilfield.com/wp-content/uploads/2014/11NSS-Lite-image-1.jpg; May 8, 2015 (2 pages).
Exhibit K to Plaintiff M-I LLC's Motion for Preliminary Injunction; *M-I LLC* vs. *FPUSA, LLC;* Case No. 5:15-CV-00406 (DAE); "Claim Chart for U.S. Pat. No. 9,004,288" (15 pages).
Exhibit N to Plaintiff M-I LLC's Motion for Preliminary Injunction; *M-I LLC* vs. *FPUSA, LLC;* Case No. 5:15-CV-00406 (DAES); "Automated Discharge"; fpusaoilfield.com/videos/; FPUSA (2 pages).
Exhibit O to Plaintiff M-I LLC's Motion for Preliminary Injunction; *M-I LLC* vs. *FPUSA, LLC;* Case No. 5:15-CV-00406 (DAES); "Vac-Screen System (VSS) Animation"; https://www.youtube.com/watch?v=4CPjHwWzVpU; Published Oct. 24, 2014; FPUSA Oilfield (2 pages).
Exhibit P to Plaintiff M-I LLC's Motion for Preliminary Injunction; *M-I LLC* vs. *FPUSA, LLC;* Case No. 5:15-CV-00406 (DAES); "Videos highlighting Vac-Screen System (VSS) overcoming surface tension on screen face to improve shale shaker performance"; fpusaoilfield.com/videos/; FPUSA (2 pages).
Exhibit Q to Plaintiff M-I LLC's Motion for Preliminary Injunction; *M-I LLC* vs. *FPUSA, LLC;* Case No. 5:15-CV-00406 (DAES); "Video Showing VSS Overcoming Surface Tension"; https://www.youtube.com/watch?t=183&v=V3Tr9CFSH2c; Published Nov. 1, 2014; FPUSA Oilfield (2 pages).
Reply Brief of Appellant; Case No. 15-1870 in the United States Court of Appeals for the Federal Circuit; *M-I LLC* vs. *FPUSA, LLC;* Dated Sep. 8, 2015 (38 pages).
Reply and Defence to Counterclaim; *Western Oilfield Equipment Rentals Ltd.* v. *M-I L.L.C.;* Court File No. T-1056-15; Dated Oct. 6, 2015 (16 pages).

(56) References Cited

OTHER PUBLICATIONS

Petition for Inter Partes Review of U.S. Pat. No. 9,004,288; *FPUSA, LLC* v. *M-I LLC;* Inter Partes Review No. IPR2016-00213; Dated Nov. 19, 2015 (65 pages).
Final Office Action issued in U.S. Pat. No. 9,004,288; Dated Oct. 15, 2014 (8 pages).
Response with amendments to Final Office Action issued in U.S. Pat. No. 9,004,288; Dated Nov. 12, 2014 (14 pages).
Notice of Allowance issued in U.S. Pat. No. 9,004,288; Dated Mar. 5, 2015 (7 pages).
Front Page For International Publication No. WO 2007/004889; dated Jan. 11, 2007 (1 page).
Derrick Corporation Composite Catalog; Buffalo, New York; 2004 (12 pages).
Shale Shakers and Drilling Fluid Systems; American Association of Drilling Engineers; Houston, Texas; 1999 (9 pages).
Extended European Search Report issued in European Application No. 15172357.4; Dated Oct. 23, 2015 (9 pages).
Extended European Search Report issued in European Application No. 15171898.8; Dated Oct. 23, 2015 (10 pages).
Decision Institution of Inter Partes Review 37 C.F.R. § 42.108 of U.S. Pat. No. 9,004,288; *FPUSA, LLC* v. *M-I LLC;* Case No. IPR2016-00213; Dated Jun. 2, 2016 (31 pages).

SHAKER AND DEGASSER COMBINATION

CROSS-REFERENCE TO RELATED APPLICATIONS

This application is a continuation of and claims priority to U.S. patent application Ser. No. 11/862,955, filed Sep. 27, 2007, which claims benefit to U.S. Provisional Patent Application No. 60/827,567, filed Sep. 29, 2006, and U.S. Provisional Patent Application No. 60/827,542, filed Sep. 29, 2006. The disclosures are incorporated herein by reference.

BACKGROUND OF THE INVENTION

Embodiments disclosed herein relate generally to shale shakers and screens for shale shakers. Specifically, embodiments disclosed herein relate to a shale shaker having pulse-vacuum assisted screening. Additionally, embodiments disclosed herein relate to methods and apparatus for removing entrained gases from a slurry.

Oilfield drilling fluid, often called "mud," serves multiple purposes in the industry. Among its many functions, the drilling mud acts as a lubricant to cool rotary drill bits and facilitate faster cutting rates. The mud is mixed at the surface and pumped downhole through a bore of the drill string to the drill bit where it exits through various nozzles and ports, lubricating and cooling the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blowout" of the well being drilled. This hydrostatic pressure offsets formation pressures thereby preventing fluids from blowing out if pressurized deposits in the formation are breeched. Two factors contributing to the hydrostatic pressure of the drilling mud column are the height (or depth) of the column (i.e., the vertical distance from the surface to the bottom of the wellbore) and the density (or its inverse, specific gravity) of the fluid used. Various weighting and lubrication agents are mixed into the drilling mud to obtain the right mixture for the type and construction of the formation to be drilled. Increasing the amount of weighting agent solute dissolved in the mud base will generally create a heavier drilling mud. Drilling mud that is too light may not protect the formation from blowouts, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

Another significant purpose of the drilling mud is to carry the cuttings away from the drill bit to the surface. As a drill bit pulverizes or scrapes the rock formation at the bottom of the borehole, small pieces of solid material are left behind. The drilling fluid exiting the nozzles at the bit stir up and carry the solid particles of rock and formation to the surface within the annulus between the drillstring and the borehole. Therefore, the fluid exiting the borehole from the annulus is a slurry of formation cuttings in drilling mud, and the cutting particulates must be removed before the mud can be recycled.

One type of apparatus used to remove cuttings and other solid particulates from drilling mud is commonly referred to in the industry as a "shale shaker." A shale shaker, also known as a vibratory separator, is a vibrating sieve-like table upon which returning used drilling mud is deposited and through which substantially cleaner drilling mud emerges. Typically, the shale shaker is an angled table with a generally perforated filter screen bottom. Returning drilling mud is deposited at the top of the shale shaker. As the drilling mud travels down the incline toward the lower end, the fluid falls through the perforations to a reservoir below thereby leaving the solid particulate material behind. The combination of the angle of inclination with the vibrating action of the shale shaker table enables the solid particles left behind to flow until they fall off the lower end of the shaker table. The above described apparatus is illustrative of one type of shale shaker known to those of ordinary skill in the art. In alternate shale shakers, the top edge of the shaker may be relatively closer to the ground than the lower end. In such shale shakers, the angle of inclination may require the movement of particulates in a generally upward direction. In still other shale shakers, the table may not be angled, thus the vibrating action of the shaker alone may enable particle/fluid separation. Regardless, table inclination and/or design variations of existing shale shakers should not be considered a limitation of the present disclosure.

Preferably, the amount of vibration and the angle of inclination of the shale shaker table are adjustable to accommodate various drilling mud flow rates and particulate percentages in the drilling mud. After the fluid passes through the perforated bottom of the shale shaker, it may either return to service in the borehole immediately, be stored for measurement and evaluation, or pass through an additional piece of equipment (e.g., a drying shaker, a centrifuge, or a smaller sized shale shaker) to remove smaller cuttings and/or particulate matter.

Screens used with shale shakers are typically emplaced in a generally horizontal fashion on a generally horizontal bed or support within a basket in the shaker. The screens themselves may be flat or nearly flat, corrugated, depressed, or contain raised surfaces. The basket in which the screens are mounted may be inclined towards a discharge end of the shale shaker. The shale shaker imparts a rapidly reciprocating motion to the basket and hence the screens. Material from which particles are to be separated is poured onto a back end of the vibrating screen, flowing toward the discharge end of the basket. Large particles that are unable to move through the screen remain on top of the screen and move toward the discharge end of the basket where they are collected. The smaller particles and fluid flow through the screen and collect in a bed, receptacle, sump, or pan beneath the screen.

In some shale shakers a fine screen cloth is used with the vibrating screen. The screen may have two or more overlaying layers of screen cloth or mesh. Layers of cloth or mesh may be bonded together and placed over a support, supports, or a perforated or apertured plate. The frame of the vibrating screen is resiliently suspended or mounted upon a support and is caused to vibrate by a vibrating mechanism (e.g., an unbalanced weight on a rotating shaft connected to the frame). Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

While there are numerous styles and sizes of filter screens, they generally follow similar design. Typically, filter screens include a perforated plate base upon which a wire mesh, or other perforated filter overlay, is positioned. The perforated plate base generally provides structural support and allows the passage of fluids therethrough, while the wire mesh overlay defines the largest solid particle capable of passing therethrough. While many perforated plate bases are generally flat or slightly curved in shape, it should be understood that perforated plate bases having a plurality of corrugated or pyramid-shaped channels extending thereacross may be used instead. In theory, the pyramid-shaped channels provide additional surface area for the fluid-solid separation process to take place, and act to guide solids along their length toward the end of the shale shaker from where they are disposed.

The separation of drilling fluid and other solids from drill cuttings using a screen shaker is often incomplete, resulting in wet drill cuttings. As described above, the drilling mud is introduced to the top of the screen and allowed to flow downward through the screen by gravity alone. Often, additional equipment, such as additional screen separators, hydro cyclones, dryers, drying shakers, centrifuges, hydro cyclone shakers, thermal desorption systems, and other equipment, are used to further dry the cuttings and recover drilling fluid. For example, cuttings from a shale shaker may fall onto a rotary vacuum dryer, where the cuttings travel on a circumferentially rotating screen. Air may be used to strip drilling fluid off the cuttings and into the screen, such as by pulling a vacuum from the interior of the rotating screen (for example, the ROTAVAC™ Rotary Vacuum Dryer fluid recovery and cuttings drying system, available from Halliburton).

It is desired to improve the rate and efficiency at which shakers remove liquid from cuttings or other solids. To enhance the gravity-driven separation as described above, it is known that increasing the head on the shaker can increase the throughput of fluids through the screen. Increasing the pressure differential through the screen will likewise increase the fluid capacity of the shaker.

One example of a shaker with increased pressure differential is disclosed by Hensley et al. in U.S. Patent Application Publication No. 2005/0183994A1. Hensley et al. disclose an integrated, transportable cutting treatment system, where a pressure differential is developed across the screens to increase the flow rate of drilling mud through the screens. Hensley et al. use an air pump to develop a vacuum beneath the screens to draw mud through the screens. However, applying a continuous vacuum beneath a screen to draw fluid through the screen may result in solids sticking to the screen, hindering the conveyance of solids off the end of the shaker as needed, thereby preventing fluids from being filtered through the screen.

There exists a continuing desire for shakers having increased fluid capacity, increased fluid flow-through rates across the screens, and/or improved fluid removal efficiencies. Accordingly, there exists a need for a shaker with increased pressure differential. Preferably, the means used to increase the pressure differential do not substantially hinder the flow of solids across the screen deck. Additionally, there exists a need for a shaker for removing entrained gases from the recovered drilling fluid.

SUMMARY OF THE INVENTION

A system for separating components of a slurry is disclosed, the system including a housing; a basket for holding at least one shaker screen, the basket movably mounted in the housing; at least one vibrator coupled to the basket; a sump disposed below the basket to collect at least a portion of the slurry passing through the at least one shaker screen; a pressure differential device fluidly connected to the sump for developing a pressure differential across the at least one shaker screen; and a toggling device for toggling the pressure differential across the screen. In some embodiments, the vapor may be degassed within the sump. In other embodiments, the system may include a degassing chamber fluidly connected to the sump and the pressure differential device, wherein the degassing chamber is disposed between the sump and the pressure differential device; and a fluid conduit fluidly connected to the degassing chamber for recovering a degassed fluid.

In another aspect, embodiments disclosed herein relate to a method for separating components of a slurry, the method including providing a slurry to a top of a screen and toggling a pressure differential across the screen from static to a vacuum below the screen. In some embodiments, the toggling may include generating at least a partial vacuum below the screen by causing a flow of vapor from a vapor space below the screen, and intermittently interrupting the vacuum by disrupting the flow of vapor. In other embodiments, the partial vacuum may be generated by causing a flow of fluid from a space below the screen, the fluid may be degassed to recover a vapor and a degassed liquid, and the toggling may be performed by intermittently interrupting the vacuum by disrupting the flow of recovered vapor.

Other aspects and advantages of the invention will be apparent from the following description and the appended claims.

DETAILED DESCRIPTION OF THE PREFERRED EMBODIMENTS

In one aspect, embodiments disclosed herein relate to a method for separating components of a slurry. As used herein, a slurry refers to a mixture of drilling fluid and drill cuttings. A slurry may be separated using a screen separator having a pressure differential across the screen. In other aspects, embodiments disclosed herein relate to a system for separating components of a slurry. The system may include, in some embodiments, a vibratory screen separator and a pressure differential device or a vacuum generating device. The pressure differential device may additionally provide a driving force to degas the recovered drilling fluid.

Figure 1:
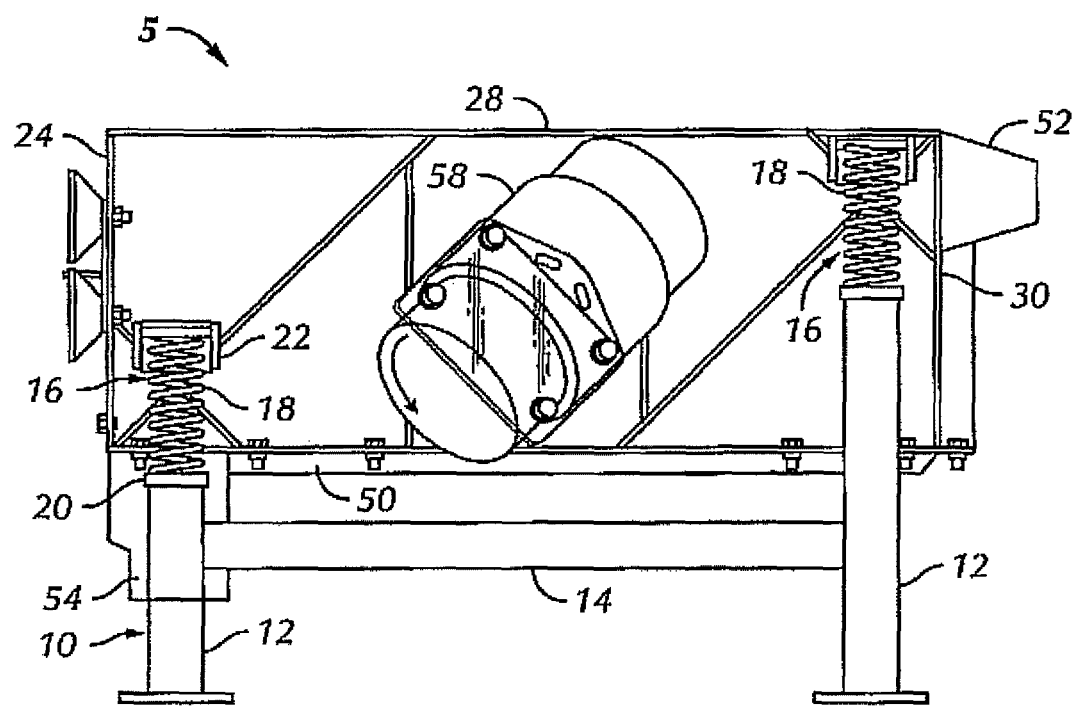
FIG. 1 is a side view of a vibratory screen separator useful in embodiments disclosed herein.
Figure 2:
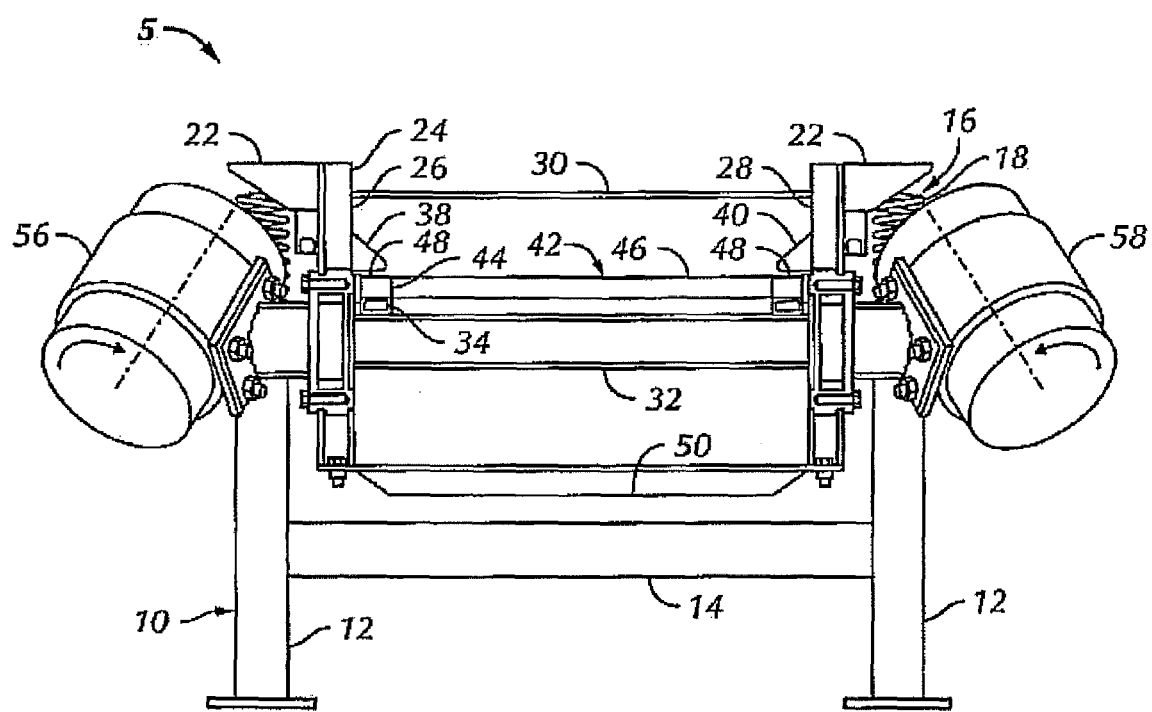
FIG. 2 is a cross-sectional view of the screen separator of FIG. 1.

FIGS. 1 and 2 illustrate one embodiment of a vibratory screen separator. The separator 5 includes a base 10 having four legs 12 and supporting members 14. Mounted on the four legs 12 are resilient mounts 16. Each mount 16 includes a spring 18, a base 20 on each leg 12 and a socket 22 on the separator to receive each spring 18. Positioned on the base 10 by the resilient mounts 16 is a separator frame or basket 24. The basket 24, includes sidewalls 26 and 28 and a back wall 30. The front side, opposite to the back wall 30, may be left open. The basket 24 is of sufficient structure to withstand the vibrational loads imposed on the basket 24 in operation. Extending across the interior of the basket 24 between the sidewalls 26 and 28 is a structural tube 32 which may be positioned at roughly the center of mass for further structural strength.

Located about the sidewalls 26 and 28 and the back wall 30 is a channel 34. Located above the channel 34 on the sidewalls 26 and 28 are stops 38 and 40. The stops cooperate with the channel 34 through its extent along the sidewalls 26 and 28 to form a screen mounting in a first plane. A screen 42 having a screen frame 44 and screen cloth 46 is illustrated positioned in the screen mounting. Resilient members 48 are positioned on the underside of the stops 38 and 40 to help locate, seat and seal the screen frame 44. Obviously, multiple screens 42 may be employed in anyone separator.

A sump 50 is located below the screen mounting to receive material passed through the screen 42. An inlet 52 is positioned at the back wall 30 above the screen mounting. An outlet 54 for material passed through the screen 42 receives material from the sump 50 for discharge. Material not passing through the screen 42 is discharged off the end of the screen 42 and suitably collected. The flow across the screen plane from the inlet 52 toward the outlet 54 defines a linear direction of material travel. Attached to the sides of the basket 24 and specifically to each sidewall 26 and 28 are two rotary eccentric vibrators 56 and 58.

As illustrated in FIGS. 1 and 2, sump 50 may be integrally connected to basket 24. Thus, sump 50 may be referred to as a vibrating sump. In other embodiments, sump 50 may be separate from basket 24, a stationary sump.

A pressure differential device (not shown) may be provided to create a pressure differential between the vapor space above screen 42 and the vapor space between screen 42 and sump 50. In some embodiments, the pressure differential device may be located internal to sump 50, such as an air pump (not shown). In other embodiments, the pressure' differential device may be located external to sump 50, such as a vacuum system (not shown). Whether internal or external to sump 50, the pressure differential device may cause vapor to flow from the vapor space between screen 42 and sump 50 to a point external to sump 50, such as through outlet 54 or other conduits forming an outlet from sump 50.

The pressure differential device may include, in some embodiments, pumps, blowers, aspirators, ejectors, and the like, and combinations thereof. In various embodiments, the pressure differential may be created by one or more of a positive displacement pump, a momentum transfer pump, or an entrapment pump.

Pumps useful in creating the pressure differential or vacuum m some embodiments include reciprocating pumps, centrifugal pumps, vacuum pumps, pneumatic pumps, electric pumps, air pumps, piston pumps, rotary piston pumps, rotary vane pumps, screw pumps, scroll pumps, liquid ring pumps, external vane pumps, Wankel pumps, Toepler pumps, and Venturi vacuum pumps, among others. Blowers useful in creating the pressure differential may include booster pumps, a rotary lobe blower (such as a ROOTS™ blower), and vacuum blowers. Useful ejectors and aspirators may include steam ejectors, water aspirators, or ejectors and aspirators utilizing other motive fluids. In some embodiments, drilling fluid is used as the motive fluid for an ejector or an aspirator.

In some embodiments, the pressure differential may be pulsed, toggled, or intermittently interrupted. Toggling or pulsing of the pressure differential, as used herein, refers to the changing of the pressure differential from static (a zero pressure differential across the screen) to at least a partial vacuum below the screen. In some embodiments, the pressure differential may be toggled from static to at least a partial vacuum. In other embodiments, the pressure differential across a screen may be toggled or pulsed from static to a full vacuum below the screen. In some embodiments, the pressure differential may be toggled from static to a pressure differential in the range from about −0.1 to about −1.0 bar, as given by a quantity defined as a pressure below the screen minus a pressure above the screen. In other embodiments, the pressure differential may be toggled from static to a pressure differential in the range from about −0.2 to about −0.7 bar, as given by a quantity defined as a pressure below the screen minus a pressure above the screen; from static to a pressure differential in the range from about −0.2 to about −0.7 bar in other embodiments; and from about −0.3 bar to about −0.6 bar in yet other embodiments. By toggling the pressure between vacuum and static, conveyance of solids across the screen may proceed unhindered, thereby avoiding solids accumulating or sticking on the screen, and thus not preventing fluid flow through the screen.

Pulsing or toggling the pressure differential between static and vacuum below the screen, in some embodiments, may be effectuated by a valve disposed between the pressure differential device (pumps, ejectors, etc., as described above) and the screen. Manipulating the valve by opening and/or closing the valve, at least partially, may disrupt the flow of vapor from the sump, thereby affecting the pressure differential. In other embodiments, the toggling device, such as a valve, may be disposed between a vacuum generating device or system and the sump located under one or more of the screens. Valves useful for toggling the pressure differential may include rotary valves, ball valves, globe valves, needle valves, butterfly valves, gate valves, plug valves, diaphragm valves, and piston valves, among others. The valves may be manually operated in some embodiments, or may be remotely actuated valves in other embodiments.

In some embodiments of the pulsed-vacuum assisted screening device disclosed herein, the separator may include two or more screens. One or more sumps may be located under the screens such that a pressure differential may be provided across less than all of the two or more shaker screens. In other embodiments, the same or different pressure differentials may be provided across zoned shaker screens.

Figure 3:
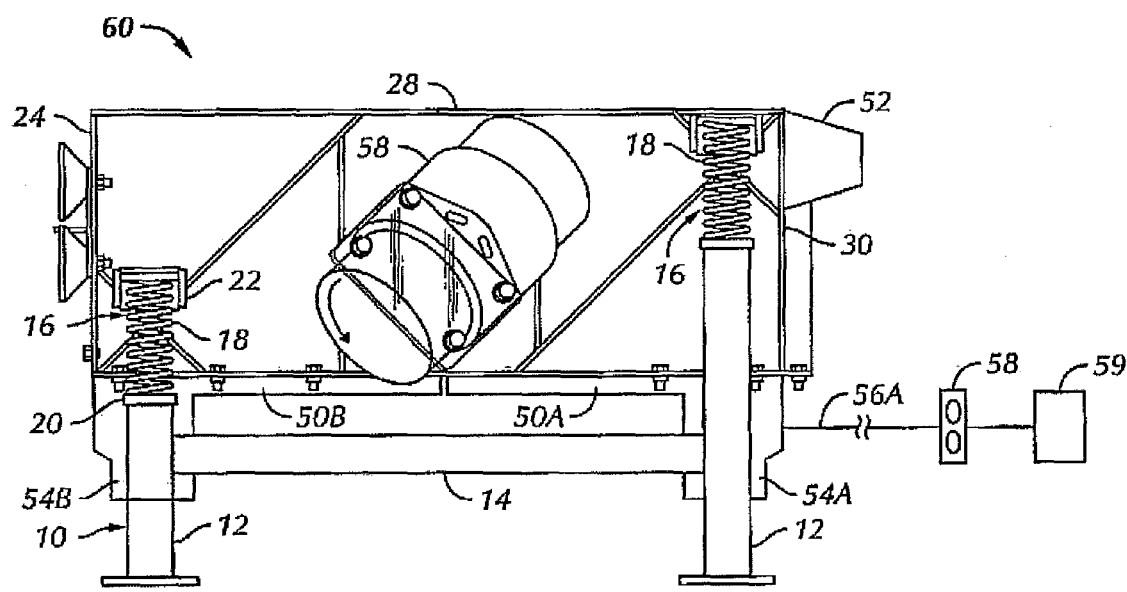
FIG. 3 is a side view of a vibratory screen separator useful in embodiments disclosed herein, where the separator may be fluidly attached to a vacuum system.

FIG. 3 illustrates one embodiment of a pulsed-vacuum assisted screening device having separate pressure zones, where like numerals represent like parts. Separator 60 may include two or more screens (not shown), correspondingly located above two or more sumps 50 (i.e., 50A and SOB as illustrated). For example, where separator 60 has four screens in series, sump 50A may be located proximate inlet 52 under the first two screens. Sump SOB may be located proximate outlet 54B, under the last two screens (where first and last corresponds to the direction of flow from inlet 52 to outlet 54B). Sump 50A may thus create an independent zone from sump 50B, allowing for operations of the two zones at the same or different pressure differentials. One or more devices may be provided to create a pressure differential across either or both sets of screens. The pressure differential across the screens in either zone may be manipulated to provide additional capacity or to enhance the liquid recovery, resulting in a dryer cutting fraction. To maintain separate pressure differentials, sumps 50A and 50B may not be in fluid communication. As such, outlet 54A may be provided to discharge material passing through the first two screens into sump 50A.

As described above, one or more pressure differential devices may be provided to create a pressure differential between the vapor space above the screens and the vapor space between the screens and sumps 50A, 50B. In some embodiments, the pressure differential devices may be located internal to sumps 50A, 50B. In other embodiments, the pressure differential devices may be located external to sumps 50A, 50B. Whether internal or external to sumps 50A, 50B, the pressure differential devices may cause vapor to flow from the vapor space between the screen and sump 50A, SOB to a point external to each sump 50A, 50B, such as through outlets 54A, 54B, or other conduits forming an outlet from sumps 50A, 50B.

For example, outlet 54A may be used as a liquid outlet, discharging the drilling fluid and other solids passing through screens. An outlet 56A may be provided to convey vapor from sump 50A to create the desired pressure differential. Outlet 56A, in some embodiments, may be connected to a lobe pump 58 or to one or more vacuum generating devices as described above. The vapor discharge from vacuum generating device 58 may then be vented or further processed, such as through a vapor recovery or incineration system 59.

Figure 4:
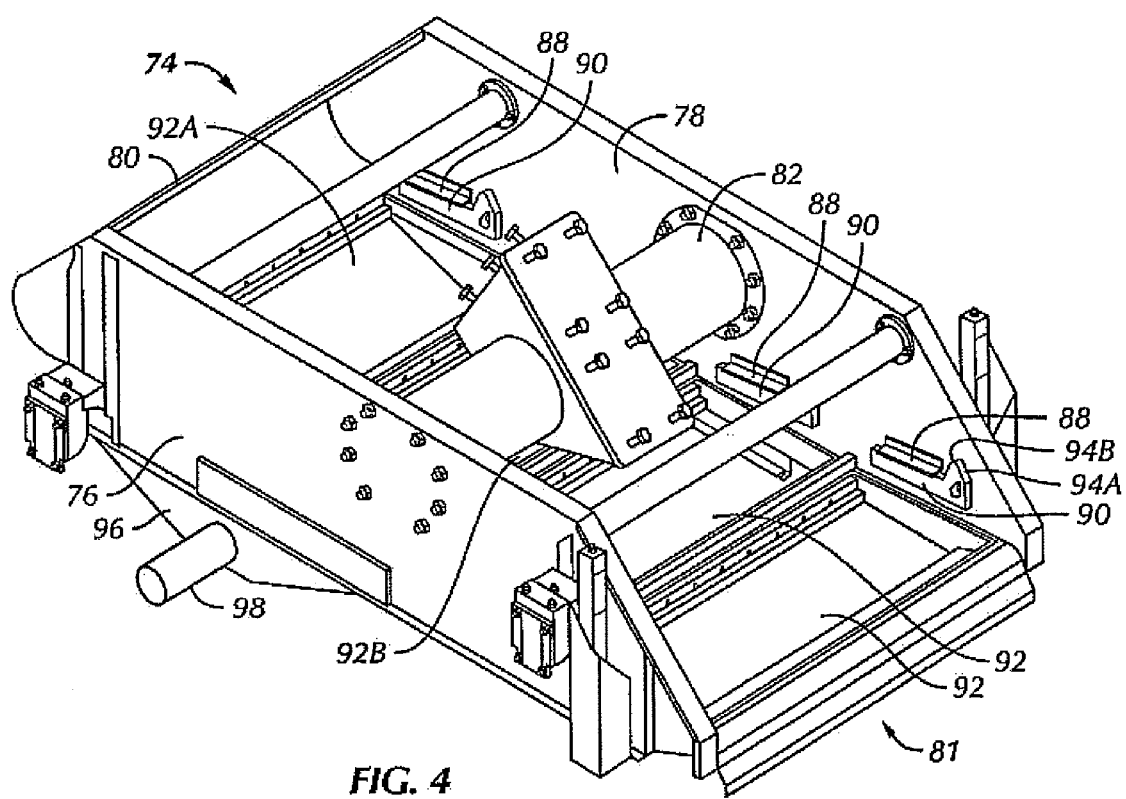
FIG. 4 is a perspective view of a vibratory screen separator frame and sump useful in embodiments disclosed herein.

FIG. 4 illustrates another embodiment of the pulsed-vacuum assisted screening device. The separator may include a base, legs, supporting members, and other component parts as previously illustrated for mounting separator frame 74. Separator frame 74 may include sidewalls 76, 78 and a back wall 80. The front side 81, opposite to the back wall 80, may be left open. The frame 74 may be of sufficient structure to withstand the vibrational loads imposed on the frame 74. Extending across the interior of the frame 74 between the sidewalls 76, 78 may be a structural tube 82 which may be positioned at roughly the center of mass, for further structural strength.

Located about the sidewalls 76 and 78 and the back wall 80 is a channel (not shown). Located above the channel on the sidewalls 76 and 78 are stops 88 and 90. The stops cooperate with the channel (not shown) through its extent along the sidewalls 76 and to form a screen mounting in a first plane. A screen 92 is illustrated positioned in the screen mounting. Multiple screens 92 may be employed in anyone separator.

One or more shaker screens 92 may be installed in, or secured to, the shale shaker frame 74 with a wedge block 94. The screen 92 is placed on a support rail (not shown) and positioned underneath a stationary wedge guide 88 (stop 88). The wedge block 90 (stop 90) is then pounded into position so as to secure the screens 92 to frame 74. One of ordinary skill in the art will appreciate that the operator often chooses to use a combination of a hammer and a suitable piece of wood in contact with the wedge block 90 to deliver sufficient force to fully tighten the wedge block 90. As shown in FIG. 4, the wedge block 90 may also include a hammer surface 94 to aid in installation (as by pounding on surface 94a) and removal (as by pounding on surface 94b).

An inlet (not shown) may be located proximate back wall 80. The solids may then travel on top of the screens toward front side 81. As illustrated, the separator has four screens 92. The drilling mud may be deposited on the first screen 92A. A sump 96 may be provided under the first two screens 92A, 92E. As illustrated, sump 96 may be integrally formed with frame 74. One or more pressure differential devices, as described above, may be provided to generate a pressure differential across screens 92A, 92B. An outlet 98 may be provided to convey vapor from sump 96 to create the desired pressure differential.

Figure 5:
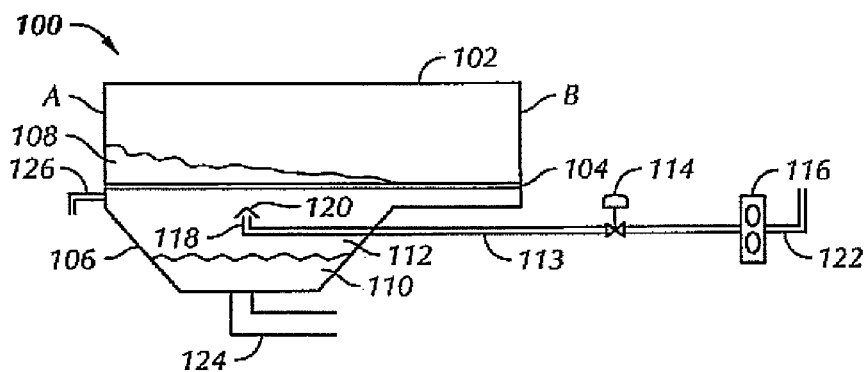
FIG. 5 is a simplified flow diagram for embodiments of a system for generating a pressure differential across a screen and degassing a fluid according to embodiments disclosed herein.

Referring now to FIG. 5, a simplified flow diagram for embodiments of a system for generating a pressure differential across a screen and degassing a fluid, according to embodiments disclosed herein, is illustrated. A shaker 100 may include a basket 102, shaker screen 104, and sump 106, as described above. A drilling fluid 108 to be separated, such as a mixture of drilling mud and drill cuttings, may be fed to inlet end A of the shaker 100. Drill cuttings separated from drilling fluid 108 may be recovered at outlet end B. The drilling mud 110 separated from the drill cuttings may be collected in sump 106.

To generate the desired intermittent pressure differential across screen 104, the vapor space 112 of sump 106 may be fluidly connected via flow line 113 to a valve 114 and a pressure differential device 116, as described above. To prevent liquids from entering flow line 113 and pressure differential device 116, vacuum system inlet 118 may be disposed vertically downward, may include a cover 120, such as to direct fluid away from inlet 118, or may include other safety devices to prevent fluid from entering the vapor system.

Vapors recovered via pressure differential device 116 may be flared, vented, or recovered via flow line 122. Fluids 110 may be recovered from sump 106 via flow line 124, and in some embodiments may be directed to a mud tank for further processing and/or recycled to the mud system.

In the embodiment illustrated in FIG. 5, the fluid 110 collecting in sump 106 during the separations may be degassed or partially degassed by the vacuum or partial vacuum generated by pressure differential device 116. Operation of pressure differential device 116 results in at least a partial vacuum in sump 106, and may provide a driving force for gases that may be dissolved or entrained in the fluid 110 to be separated therefrom.

If necessary, a vent 126 may be provided to aid in pressure control of sump 106 or to provide means to avoid under-pressure of sump 106, where vent 126 may include pressure relief valves and other devices known in the art to provide flow in limited circumstances.

Figure 6:
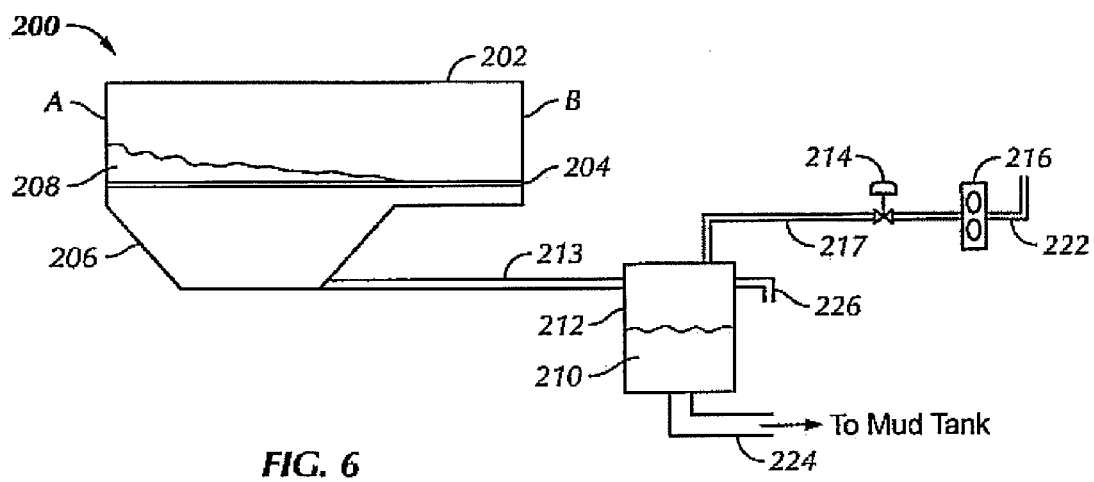
FIG. 6 is a simplified flow diagram for embodiments of a system for generating a pressure differential across a screen and degassing a fluid according to embodiments disclosed herein.

Referring now to FIG. 6, a simplified flow diagram for embodiments of a system for generating a pressure differential across a screen and degassing the recovered fluid, according to embodiments disclosed herein, is illustrated. A shaker 200 may include a basket 202, shaker screen 204, and sump 206, as described above. A drilling fluid 208 to be separated, such as a mixture of drilling mud and drill cuttings, may be fed to inlet end A of the shaker 200. Drill cuttings separated from drilling fluid 208 may be recovered at outlet end B. The drilling mud 210 separated from the drill cuttings may be collected in sump 206.

To generate the desired intermittent pressure differential across screen 204, sump 206 may be fluidly connected via flow line 213 to a degassing chamber 212, valve 214, and a pressure differential device 216, as described above. Generation of the intermittent pressure differential across screen 204 results in both liquids and vapors being pulled from sump 206 to degassing chamber 212. The vapors collecting in degassing chamber 212 may be recovered via flow line 217, and may be flared, vented, or otherwise recovered via flow line 222. Fluids 210 collecting in degassing chamber 212 may be recovered via flow line 224, and in some embodiments may be directed to a mud tank for further processing and/or recycling to the mud system. If necessary, a vent 226 may be provided to aid in pressure control of degassing chamber 212, where vent 226 may include pressure relief valves and other devices known in the art to provide flow in limited circumstances.

The fluid 210 collecting in degassing chamber 212 during the separation process may be degassed or partially degassed by the vacuum or partial vacuum generated by the pressure differential device 216. Operation of pressure differential device 216 results in at least a partial vacuum in degassing chamber 212, and may provide a driving force for gases that may be dissolved or entrained to be separated from the fluid 210. Such degassing that may occur in embodiments described herein may allow for a simplified mud tank system, where vents and other degassing equipment may not be necessary.

As described above, shaker systems described herein may include a pressure differential device or vacuum generating device to generate an intermittent pressure differential across a shaker screen. The vacuum generated by the pressure differential device may provide an additional driving force for separating fluids from drill cuttings, and may additionally remove vapors and entrained gases from the filtered drilling fluid.

Figure 7:
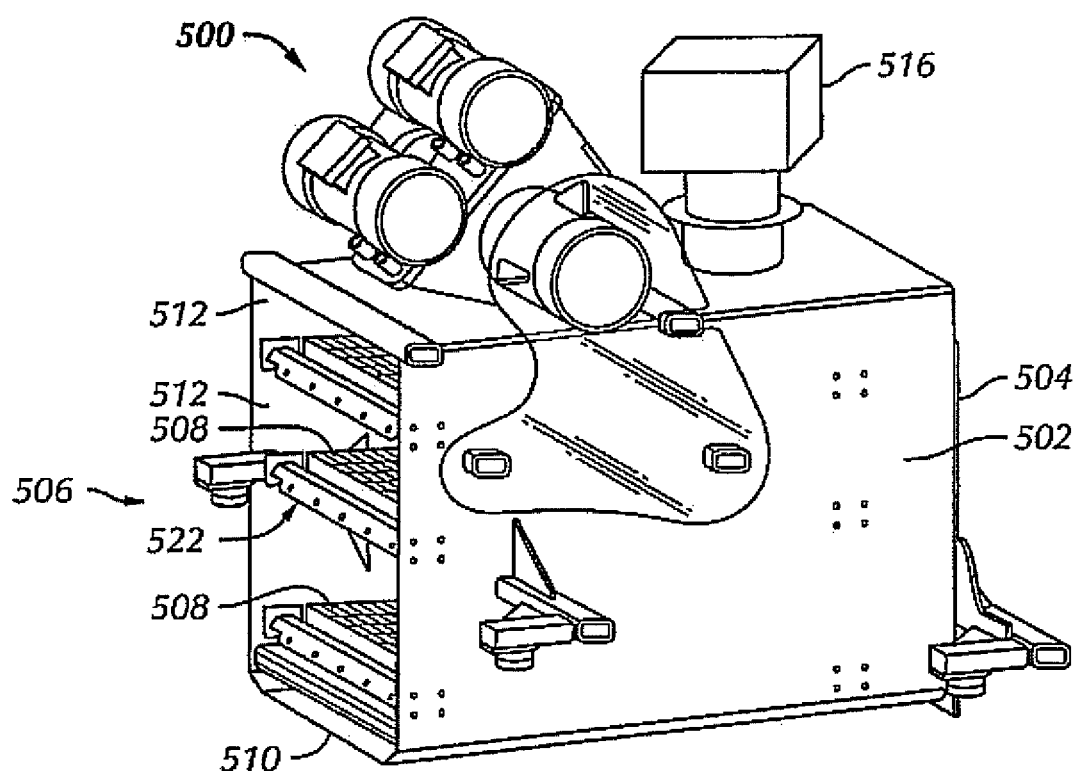
FIG. 7 is a perspective view of a vibratory screen separator having a vacuum fume extraction device in accordance with embodiments disclosed herein.

Referring now to FIG. 7, a perspective view of a vibratory separator 500 in accordance with an embodiment of the present disclosure is shown. In this embodiment, vibratory separator 500 includes a housing 502, a drilling fluid inlet end 504, an outlet end 506, and a plurality shaker screens 508. In the embodiment shown, the plurality of shaker screens 508 are assembled in a multi-tier configuration. By vertically stacking multiple shaker screens 508, the footprint of vibratory separator 500 is decreased, thereby providing equivalent separating potential while requiring less space. In vibratory separators 500 using vertically stacked shaker screens 508, the size of the apertures in the screens may be varied according to each tier. As drilling fluid begins to flow from a top tier of vibratory separator 500, the screen assembly apertures may be substantially greater in size than the apertures of lower screen assemblies. To prevent drilling fluid from falling on lower disposed shaker screens assemblies 508, a series of flowback pans 522 may be located under shaker screens 508. Flowback pans 522 may be directed to deposit drilling fluid into a sump 510, thereby allowing drilling fluid to be substantially cleaner at each level of processing.

In this embodiment, vibratory separator 500 also includes a fume hood/outlet 516 connected to housing 502. In one embodiment, the fume hood/outlet 516 may include a vacuum system that extracts vapors into the vent hood/outlet 516. As drilling fluid enters vibratory shaker 500 through inlet end 504, the drilling fluid falls onto shaker screen 508 and is conveyed from inlet end 504 to outlet end 506 using vibratory motion and pulse-assisted screening devices as described above. As the drilling fluid is conveyed, vapors, including potentially hazardous gases, for example, hydrogen sulfide ("$H_2S$"), entrained in the drilling fluid may be present.

In this embodiment, fume hood/outlet 516 is configured to extract vapors from the drilling fluid as it flows across the shaker screens 508. As vapors and fumes are released in a generally upward direction from the drilling fluid; fume hood/outlet 516 may pull the vapors and fumes inward, thereby trapping the potentially hazardous fumes and/or vapors. Those having ordinary skill in the art will appreciate that by using a fume hood, potentially noxious odors/hazardous conditions may be avoided by directing the flow of air into the hood. Once directed into the hood, a number of subsequent steps may be performed to further treat or vent the trapped gases.

One of ordinary skill in the art will appreciate that fume hood/outlet 516 may be turned on during any step of the separation process including during normal separation, during cleaning, or substantially continuously. Thus, embodiments including fume hood/outlets 516 may provide for a vibratory separator 500 that is substantially enclosed, thereby preventing the escape of hazardous materials and/or vapors into the drilling work space.

In one embodiment, vibratory separator 500 may further include one or more pressure differential devices (not shown) to create a pressure differential between a vapor space 512 above and between the screens 508 and sump 510. In some embodiments, the pressure differential devices (not shown) may be located internal to sump 510. In other embodiments, the pressure differential devices (not shown) may be located external to sump 510. Whether internal or external to sump 510, the pressure differential devices (not shown) may cause vapor to flow from the vapor space between the screens 508 and sump 510 to a point external to sump 510, such as through outlets 54A, 54B (shown in FIG. 3). Fume hood/outlet 516 may be in fluid connection with outlets 54A, 54B to pull vapors that flow through such outlets 54A, 54B, thereby trapping the potentially hazardous fumes and/or vapors. Vapors and fumes trapped in fume hood/outlet 516 may be treated and/or safely removed from vibratory shaker 500 thereafter.

In other embodiments, vibratory separator 500 may include one or more pressure differential devices (not shown) to create a pressure differential between a vapor space 512 above the screens 508 and flowback pans 522. In some embodiments, the pressure differential devices (not shown) may be located internal to flowback pans 522. In other embodiments, the pressure differential devices (not shown) may be located external to flowback pans 522. Whether internal or external to flowback pans 522, the pressure differential devices (not shown) may cause vapor to flow from the vapor space between the screens 508 and flowback pans 522 to a point external to flowback pans 522, such as through outlets 54A, 54B (shown in FIG. 3). Fume hood/outlet 516 may be in fluid connection with outlets 54A, 54B to pull vapors that flow through such outlets 54A, 54B, thereby trapping the potentially hazardous fumes and/or vapors. Vapors and fumes trapped in fume hood/outlet 516 may be treated and/or safely removed from vibratory shaker 500 thereafter.

In one embodiment, after the drilling fluid passes through shaker screens 508, the drilling fluid may be directed to a containment area where the drilling fluid may be degassed to remove remaining entrained gases. Degassing the drilling fluid may be performed by any method known in the art. For example, mechanical degassers and aeration devices may used, as disclosed in U.S. Pat. Nos. 7,727,316 and 7,704, 299, assigned to the assignee of the present application, and incorporated herein by reference in their entireties. A mechanical degasser may exert a centrifugal force on the drilling fluid. The centrifugal force of the mechanical degasser multiplies the force acting on the entrained gas (e.g., $H_2S$) to increase buoyancy of the gas, thereby releasing entrained gas from the drilling fluid. The increase in buoyancy of the gas accelerates the bubble-rise velocity of the gas velocity, and as the gas bubbles rise toward the surface, they escape the drilling fluid. One of ordinary skill in the art will appreciate that any device known in the art that exerts a centrifugal force on the fluid, thereby reducing the amount of entrained or dissolved gases in the process fluid, may be used in place of a mechanical degasser.

Advantageously, embodiments disclosed herein may provide shakers having increased fluid capacity, increased fluid flow-through rates across the screens, and/or improved fluid removal efficiencies. Also, advantageously, embodiments disclosed herein may provide shakers with reduced hazardous vapors in vapor spaces. Finally, embodiments disclosed herein may provide shakers that more efficiently separate entrained gases from drilling fluids.

While the present disclosure has been described with respect to a limited number of embodiments, those skilled in the art, having benefit of this disclosure, will appreciate that other embodiments can be devised which do not depart from the scope of the disclosure as described herein. Accordingly, the scope of the present disclosure should be limited only by the attached claims.

The invention claimed is:

1. A system comprising:
a vibrating basket having an open side exposed to atmosphere;
a first screen disposed in the vibrating basket;
a sump located below the first screen; and
a pressure differential device connected to the sump to generate a pressure differential between a vapor space above the first screen adjacent the open side and a vapor space between the first screen and the sump and to pull all of liquid and air or vapor from the sump.

2. The system of claim 1, wherein the sump is coupled to the vibrating basket.

3. The system of claim 1, further comprising a valve coupled between the sump and the pressure differential device operable to adjust the pressure differential to reduce stalling of a slurry on the screen.

4. The system of claim 1, wherein the sump is located proximate a discharge end of the screen.

5. The system of claim 1, further comprising:
a second screen disposed in the vibrating basket; and
a second sump disposed below the second screen,
the pressure differential device connected to the second pump to generate a pressure differential between a vapor space above the second screen and a vapor space between the second screen and the second sump and to pull air or vapor and liquid collected in the second sump together from the sump.

6. The system of claim 1, wherein the pressure differential is adjustable and further comprising a chamber external to the vibrating basket and connected to the pressure differential generator, the pressure differential generator creating a pressure differential in the chamber to generate the pressure differential across the first screen and to move all of the fluid and vapor of the sump into the chamber.

7. The system of claim 1, further comprising:
a degassing chamber coupled between the sump and the pressure differential device; and
a vent valve coupled to the degassing chamber.

8. The system of claim 1, further comprising a fluid flow line in fluid communication with an outlet of the sump and the pressure differential device through which the pressure differential is applied to the screen and through which the liquid and air or vapor is pulled from the sump.

9. The system of claim 8, further comprising a valve coupled to the fluid flow line to vent the vapor or air.

10. The system of claim 9, wherein the valve is located inside the vibratory separator.

11. A system comprising:
a screen disposed in a vibratory separator having at least one open side;
a sump disposed below the screen, the sump comprising an outlet for discharging collected material;
a pressure differential device coupled to the outlet of the sump to generate a pressure differential across the screen while pulling the collected material through the outlet; and
a valve coupled between the pressure differential device and the sump to adjust the pressure differential applied to the screen to prevent stalling of a slurry on the screen.

12. The system of claim 11, wherein the sump is integrally formed with a frame of the vibratory separator.

13. The system of claim 11, wherein the pressure differential device pulls air and/or vapor through the outlet of the sump together with the collected material.

14. The system of claim 11, further comprising a degassing chamber and a flow line coupled to the outlet of the sump and an inlet of the degassing chamber to transfer the collected material and air or vapor from the sump to the degassing chamber and a flow line coupled between the degassing chamber and the pressure differential device.

15. The system of claim 11, further comprising:
a second screen disposed in a second vibratory separator; and
a second sump coupled to the second vibratory separator and disposed below the second screen,
wherein the pressure differential device generates a pressure differential across the second screen to pull liquid and air or vapor from the second sump.

16. A method comprising:
flowing a slurry of drill cuttings and fluid over a first screen disposed in a vibratory separator;
collecting a portion of the fluid of the slurry and air or vapor passing through the first screen in a sump below the first screen; and
actuating a pressure differential device connected to a first sump coupled to the vibratory separator and disposed below the first screen, the actuating comprising:
creating a pressure differential across the first screen;
pulling all of the portion of the fluid of the slurry and the air or vapor from the first sump to a degassing chamber external to the vibratory separator; and
adjusting the pressure differential across the first screen during the collecting to prevent stalling of the slurry on the first screen; and
separating at least a portion of the air or vapor from the portion of the fluid in the degassing chamber.

17. The method of claim 16, further comprising opening a valve coupled to a fluid line disposed between the first sump and the pressure differential device to adjust the pressure differential across the first screen to prevent stalling of the slurry on the first screen.

18. The method of claim 16, wherein the actuating a pressure differential device further comprises:
creating a pressure differential across a second screen; and
pulling a liquid component separated from the slurry by a second screen from a second sump disposed below the second screen together with vapor or air to a location external to the vibratory separator.

19. The method of claim 18, wherein the second screen and the second sump are disposed in a second vibratory separator.

20. A system comprising:
a vibratory separator having a side open to atmosphere and a screen mounting;
a sump located below the screen mounting, the sump having an outlet;
a pressure differential device to generate a pressure differential across the screen by pulling air or vapor from above the sump; and
a fluid flow line in fluid communication with the outlet of the sump and the pressure differential device through which the pressure differential is pulled and through which all liquid and vapor or air in the sump is pulled from the sump.

* * * * *